US010460512B2

(12) United States Patent
Chen

(10) Patent No.: US 10,460,512 B2
(45) Date of Patent: Oct. 29, 2019

(54) 3D SKELETONIZATION USING TRUNCATED EPIPOLAR LINES

(71) Applicant: Microsoft Technology Licensing, LLC, Redmond, WA (US)

(72) Inventor: Qiuyu Chen, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 21 days.

(21) Appl. No.: 15/806,145

(22) Filed: Nov. 7, 2017

(65) Prior Publication Data

US 2019/0139297 A1  May 9, 2019

(51) Int. Cl.
*G06T 15/20* (2011.01)
*G06T 17/20* (2006.01)
(Continued)

(52) U.S. Cl.
CPC ............ *G06T 15/205* (2013.01); *G06T 15/04* (2013.01); *G06T 17/20* (2013.01); *H04N 13/204* (2018.05);
(Continued)

(58) Field of Classification Search
CPC ....... G06T 15/205; G06T 15/04; G06T 17/20; G06T 2211/432; H04N 13/204; H04N 13/271; G06K 9/00362; G06K 9/46
See application file for complete search history.

(56) References Cited

U.S. PATENT DOCUMENTS 5,432,712 A * 7/1995 Chan ...................... G01C 11/06
382/191
5,497,451 A * 3/1996 Holmes .................. G06T 17/20
345/420
(Continued)

FOREIGN PATENT DOCUMENTS

WO    WO2015017941 A1 *  2/2015  ............. G01B 21/20

OTHER PUBLICATIONS de Aguiar et al., "Marker-less 3D Feature Tracking for Mesh-based Human Motion Capture," In *Proceedings of the 2nd conference on Human motion: understanding, modeling, capture and animation*, pp. 1-15 (Oct. 20, 2007).
(Continued)

*Primary Examiner* — Devona E Faulk
*Assistant Examiner* — Charles L Beard
(74) *Attorney, Agent, or Firm* — Klarquist Sparkman, LLP

(57) ABSTRACT

Technologies are provided for generating three-dimensional (3D) skeletons of target objects using images of the target objects captured from different viewpoints. Images of an object (such as a person) can be captured from different camera angles. Feature keypoints of the object can be identified in the captured images. Keypoints that identify a same feature in separate images can be correlated using truncated epipolar lines. For example, depth information for a keypoint can be used to truncate an epipolar line that is created using the keypoint. The correlated feature keypoints
(Continued)

can be used to create 3D feature coordinates for the associated features of the object. A 3D skeleton can be generated using the 3D feature coordinates. One or more 3D models can be mapped to the 3D skeleton and rendered. The rendered one or more 3D models can be displayed on one or more display devices.

20 Claims, 9 Drawing Sheets

(51) Int. Cl.
*G06T 15/04* (2011.01)
*H04N 13/204* (2018.01)
*H04N 13/271* (2018.01)
*G06K 9/46* (2006.01)
*G06K 9/00* (2006.01)

(52) U.S. Cl.
CPC ....... *H04N 13/271* (2018.05); *G06K 9/00362* (2013.01); *G06K 9/46* (2013.01)

(56) References Cited

U.S. PATENT DOCUMENTS

| | | | | |
|---|---|---|---|---|
| 5,818,959 | A * | 10/1998 | Webb | H04N 13/243 382/154 |
| 6,072,496 | A * | 6/2000 | Guenter | G06K 9/00201 345/419 |
| 6,473,536 | B1 * | 10/2002 | Chiba | G06T 11/00 345/630 |
| 6,546,120 | B1 * | 4/2003 | Etoh | G06T 7/20 348/154 |
| 6,778,709 | B1 * | 8/2004 | Taubman | H04N 19/70 348/395.1 |
| 6,862,364 | B1 * | 3/2005 | Berestov | G06T 5/008 382/132 |
| 7,209,577 | B2 | 4/2007 | McAlpine et al. | |
| 7,840,058 | B2 * | 11/2010 | Payton | G06K 9/0063 345/419 |
| 8,160,400 | B2 * | 4/2012 | Snavely | G06K 9/00637 382/305 |
| 8,175,326 | B2 * | 5/2012 | Siegel | G06K 9/00342 382/100 |
| 8,401,276 | B1 * | 3/2013 | Choe | G01C 11/06 382/154 |
| 8,442,307 | B1 * | 5/2013 | Anati | G06T 7/73 382/154 |
| 8,717,421 | B2 * | 5/2014 | Peters, II | G06T 7/85 348/47 |
| 8,905,551 | B1 * | 12/2014 | Worley, III | G03B 21/26 353/79 |
| 8,922,547 | B2 * | 12/2014 | Lim | G06T 19/00 345/419 |
| 8,928,736 | B2 * | 1/2015 | Nakajima | G06T 17/20 348/46 |
| 9,098,740 | B2 * | 8/2015 | Yoo | G06K 9/00375 |
| 9,323,338 | B2 * | 4/2016 | He | G06F 3/017 |
| 9,418,434 | B2 * | 8/2016 | Marks | G06T 7/586 |
| 9,519,969 | B1 * | 12/2016 | Kusens | G08B 21/043 |
| 9,530,240 | B2 * | 12/2016 | Wang | G06T 7/12 |
| 9,558,557 | B2 * | 1/2017 | Jiang | G06T 7/74 |
| 9,721,386 | B1 * | 8/2017 | Worley, III | G06T 19/006 |
| 10,008,027 | B1 * | 6/2018 | Baker | G06T 7/0051 |
| 10,038,842 | B2 * | 7/2018 | Williams | G06T 3/4038 |
| 10,094,650 | B2 * | 10/2018 | Todeschini | G01B 11/00 |
| 2004/0212725 | A1 * | 10/2004 | Raskar | G06T 15/02 348/370 |
| 2005/0100207 | A1 * | 5/2005 | Konolige | G06T 7/20 382/154 |
| 2005/0128196 | A1 * | 6/2005 | Popescu | G01B 11/25 345/420 |
| 2006/0103645 | A1 * | 5/2006 | Jacobson | G06T 15/40 345/418 |
| 2006/0228101 | A1 * | 10/2006 | Sullivan | G03B 15/16 396/153 |
| 2007/0183669 | A1 * | 8/2007 | Owechko | G06K 9/00369 382/224 |
| 2007/0285419 | A1 * | 12/2007 | Givon | G06K 9/3216 345/420 |
| 2008/0247668 | A1 * | 10/2008 | Li | G06K 9/32 382/285 |
| 2009/0010507 | A1 * | 1/2009 | Geng | G06T 7/593 382/128 |
| 2009/0052796 | A1 * | 2/2009 | Furukawa | G06K 9/00503 382/260 |
| 2009/0092277 | A1 * | 4/2009 | Ofek | G06K 9/00664 382/100 |
| 2009/0167763 | A1 * | 7/2009 | Waechter | G06T 15/06 345/426 |
| 2009/0167843 | A1 * | 7/2009 | Izzat | G06T 7/593 348/43 |
| 2009/0207235 | A1 * | 8/2009 | Francini | G06K 9/209 348/46 |
| 2009/0304264 | A1 * | 12/2009 | Au | G06T 7/557 382/154 |
| 2009/0304266 | A1 * | 12/2009 | Aoki | G01C 11/06 382/154 |
| 2009/0324041 | A1 * | 12/2009 | Narayanan | G06K 9/00986 382/131 |
| 2010/0020178 | A1 * | 1/2010 | Kleihorst | G06T 7/85 348/175 |
| 2010/0045701 | A1 | 2/2010 | Scott | |
| 2010/0111370 | A1 * | 5/2010 | Black | G06K 9/00369 382/111 |
| 2010/0303303 | A1 * | 12/2010 | Shen | G06K 9/00335 382/107 |
| 2011/0063403 | A1 * | 3/2011 | Zhang | G06K 9/00261 348/14.1 |
| 2011/0115798 | A1 * | 5/2011 | Nayar | G06T 13/40 345/473 |
| 2011/0300929 | A1 * | 12/2011 | Tardif | A63F 13/213 463/30 |
| 2012/0019517 | A1 * | 1/2012 | Corazza | G06T 13/40 345/419 |
| 2012/0105585 | A1 * | 5/2012 | Masalkar | G06F 3/017 348/46 |
| 2012/0127267 | A1 * | 5/2012 | Zhang | G06T 7/579 348/43 |
| 2012/0147152 | A1 * | 6/2012 | Vogiatis | H04N 13/221 348/50 |
| 2012/0154577 | A1 * | 6/2012 | Yoshikawa | H04N 7/18 348/140 |
| 2012/0162217 | A1 * | 6/2012 | Lim | G06T 15/205 345/419 |
| 2012/0163675 | A1 * | 6/2012 | Joo | G06T 7/13 382/107 |
| 2012/0206597 | A1 * | 8/2012 | Komoto | G06K 9/00805 348/135 |
| 2012/0313927 | A1 * | 12/2012 | Curington | G06T 9/00 345/419 |
| 2013/0195330 | A1 * | 8/2013 | Kim | G06K 9/00201 382/128 |
| 2013/0250050 | A1 * | 9/2013 | Kanaujia | H04N 7/181 348/42 |
| 2013/0251193 | A1 * | 9/2013 | Schamp | G06K 9/00201 382/103 |
| 2013/0251194 | A1 * | 9/2013 | Schamp | G06T 7/11 382/103 |
| 2014/0037189 | A1 * | 2/2014 | Ziegler | G06T 17/00 382/154 |
| 2014/0043329 | A1 * | 2/2014 | Wang | G06T 17/20 345/420 |
| 2014/0043444 | A1 * | 2/2014 | Haraguchi | G01B 11/03 348/47 |
| 2014/0049612 | A1 * | 2/2014 | Ishii | G01B 11/00 348/46 |
| 2014/0055352 | A1 * | 2/2014 | Davis | G06F 3/017 345/156 |

(56) References Cited

U.S. PATENT DOCUMENTS

| | | | | |
|---|---|---|---|---|
| 2014/0064607 A1* | 3/2014 | Grossmann | G06T 3/0093 | 382/154 |
| 2014/0112572 A1* | 4/2014 | Reif | G06K 9/6211 | 382/154 |
| 2014/0125663 A1* | 5/2014 | Zhang | G06K 9/00214 | 345/420 |
| 2014/0232822 A1* | 8/2014 | Venkataraman | H04N 5/225 | 348/43 |
| 2014/0267243 A1* | 9/2014 | Venkataraman | G06T 7/557 | 345/419 |
| 2014/0267614 A1* | 9/2014 | Ding | G06T 17/10 | 348/46 |
| 2014/0285517 A1* | 9/2014 | Park | G06T 11/60 | 345/632 |
| 2014/0334670 A1* | 11/2014 | Guigues | G06T 7/251 | 382/103 |
| 2015/0024337 A1* | 1/2015 | Blassnig | G06T 15/06 | 433/29 |
| 2015/0045605 A1* | 2/2015 | Hirai | A61N 5/103 | 600/1 |
| 2015/0049174 A1* | 2/2015 | Lee | H04N 13/221 | 348/50 |
| 2015/0123890 A1* | 5/2015 | Kapur | G06F 3/0304 | 345/156 |
| 2015/0161798 A1* | 6/2015 | Venkataraman | G01P 3/38 | 348/47 |
| 2015/0164356 A1* | 6/2015 | Merschon | A61B 5/04017 | 600/374 |
| 2015/0170370 A1* | 6/2015 | Ukil | G09G 5/377 | 382/154 |
| 2015/0206313 A1* | 7/2015 | Reif | G06F 3/017 | 382/103 |
| 2015/0221093 A1* | 8/2015 | Sagawa | G01B 11/2513 | 345/419 |
| 2015/0264337 A1* | 9/2015 | Venkataraman | G01P 3/38 | 348/47 |
| 2015/0351713 A1* | 12/2015 | Sato | A61B 6/481 | 378/41 |
| 2015/0371381 A1* | 12/2015 | Sato | G06T 7/0012 | 382/132 |
| 2016/0110595 A1* | 4/2016 | Wang | G06K 9/00375 | 705/27.2 |
| 2016/0180600 A1* | 6/2016 | Liu | G06T 19/20 | 345/419 |
| 2016/0188994 A1* | 6/2016 | Wu | G06T 7/593 | 382/195 |
| 2016/0191759 A1* | 6/2016 | Somanath | H04N 5/23212 | 348/349 |
| 2016/0247279 A1* | 8/2016 | Lavi | G16H 50/50 | |
| 2016/0292533 A1* | 10/2016 | Uchiyama | G06T 7/593 | |
| 2016/0323565 A1* | 11/2016 | van Baarsen | G06T 7/593 | |
| 2016/0337635 A1* | 11/2016 | Nisenzon | H04N 13/271 | |
| 2017/0018117 A1* | 1/2017 | Chen | G06K 9/00369 | |
| 2017/0032520 A1* | 2/2017 | Nitzken | G06T 7/0012 | |
| 2017/0046868 A1* | 2/2017 | Chernov | H04N 13/221 | |
| 2017/0070731 A1* | 3/2017 | Darling | H04N 17/002 | |
| 2017/0076454 A1* | 3/2017 | Yano | H04N 13/366 | |
| 2017/0085733 A1* | 3/2017 | Ilic | G06T 19/20 | |
| 2017/0091996 A1* | 3/2017 | Wei | G06T 17/20 | |
| 2017/0116779 A1* | 4/2017 | Lalish | G06T 15/04 | |
| 2017/0135655 A1* | 5/2017 | Wang | A61B 6/14 | |
| 2017/0154424 A1* | 6/2017 | Uchiyama | G01S 3/00 | |
| 2017/0169603 A1* | 6/2017 | Chen | G06T 3/20 | |
| 2017/0171525 A1* | 6/2017 | Koehle | H04N 13/239 | |
| 2017/0185141 A1* | 6/2017 | Shotton | G06F 3/011 | |
| 2017/0208292 A1 | 7/2017 | Smits | | |
| 2017/0213320 A1* | 7/2017 | Yucer | G06T 7/579 | |
| 2017/0266491 A1* | 9/2017 | Rissanen | G06K 9/00342 | |
| 2017/0273639 A1* | 9/2017 | Iscoe | G06F 19/3475 | |
| 2017/0318280 A1* | 11/2017 | Nisenzon | H04N 5/2258 | |
| 2017/0337700 A1* | 11/2017 | Wilson | G06T 7/262 | |
| 2017/0337707 A1* | 11/2017 | Chuang | G06T 7/80 | |
| 2017/0337732 A1* | 11/2017 | Tamersoy | G06K 9/00369 | |
| 2017/0339395 A1* | 11/2017 | Hall | H04N 13/239 | |
| 2017/0339400 A1* | 11/2017 | Hall | H04N 5/247 | |
| 2017/0347120 A1* | 11/2017 | Chou | H04N 19/597 | |
| 2018/0039745 A1* | 2/2018 | Chevalier | G16H 10/60 | |
| 2018/0059679 A1* | 3/2018 | Taimouri | G05D 1/0088 | |
| 2018/0103244 A1* | 4/2018 | Fang | H04N 13/128 | |
| 2018/0113083 A1* | 4/2018 | Van Dael | G01N 23/18 | |
| 2018/0139436 A1* | 5/2018 | Yucer | G06T 7/564 | |
| 2018/0174347 A1* | 6/2018 | Chaney | G06T 13/40 | |
| 2018/0276885 A1* | 9/2018 | Singh | G06T 17/20 | |
| 2018/0308249 A1* | 10/2018 | Nash | G06T 7/73 | |
| 2018/0310854 A1* | 11/2018 | Geva | A61B 5/04012 | |
| 2018/0338710 A1* | 11/2018 | Tas | H04N 13/204 | |
| 2018/0350088 A1* | 12/2018 | Dou | G06T 7/596 | |
| 2018/0374242 A1* | 12/2018 | Li | G06T 11/001 | |
| 2019/0000412 A1* | 1/2019 | Wong | G01B 11/2504 | |
| 2019/0028688 A1* | 1/2019 | Kumar | H04N 13/246 | |
| 2019/0080430 A1* | 3/2019 | Zhang | G06T 3/0018 | |
| 2019/0101758 A1* | 4/2019 | Zhu | G02B 27/0172 | |
| 2019/0102898 A1* | 4/2019 | Tanabe | G06T 7/593 | |
| 2019/0114832 A1* | 4/2019 | Park | G06T 17/20 | |
| 2019/0156145 A1* | 5/2019 | Pourian | G06K 9/6211 | |
| 2019/0164341 A1* | 5/2019 | Venkataraman | G06T 7/593 | |

OTHER PUBLICATIONS

Cutler et al., "Holoportation," 4pp., available at: https://www.microsoft.com/en-us/research/project/holoportation-3/ (Mar. 25, 2016).

Hussein, "Cyber Learning from Reality through Virtuality Toholoportation: Status-Quo and a Proposed Model for Closing the Gap in Africa," *ASRO Journal of Education*, vol. 1, Issue 2, pp. 23-33 (Nov. 2016).

Martin Kuechler & Andreas Kunz, "HoloPort—A Device for Simultaneous Video and Data Conferencing Featuring Gaze Awareness," In *Proceedings of IEEE Virtual Reality*, pp. 81-87 (Mar. 25, 2006).

Richard Hartley & Andrew Zisserman, *Multiple View Geometry in Computer Vision*, chapters 4 & 9 ($2^{nd}$ ed. 2003)

Slotsbo, "3D Interactive and View Dependent Stereo Rendeirng," In *Master's Thesis of Technical University of Denmark*, 96pp. (2004).

Wei et al., "Convolutional Pose Machines," *The IEEE Conference on Computer Vision and Pattern Recognition (CVPR)*, pp. 4724-4732, (2016).

\* cited by examiner

3D SKELETONIZATION USING TRUNCATED EPIPOLAR LINES

BACKGROUND

Creating a three-dimensional (3D) representations of objects from two-dimensional (2D) images can be a difficult task. For example, creating the 3D representation can require inferring 3D features of the object based on 2D features depicted in the images. However, it can be difficult to determine whether two images depict a same feature of an object from different perspectives.

In some solutions, points in separate 2D images are correlated using an epipolar line. A feature point in one image can be used to project an epipolar line onto another image. A feature point in the other image intersected by the epipolar line may be correlated with the feature point used to project the line. However, in complex scenes, or scenes involving multiple objects, epipolar lines may not be effective for identifying correlated features. In at least some cases, an epipolar line can bisect a large area of an image, multiple candidate feature points may be intersected by the line. In such cases, it may not be possible to determine which of the intersected feature points ought to be correlated with the feature point used to project the epipolar line.

Therefore, there exists ample opportunity for improvement in technologies related to network-controlled video capture and processing.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are provided herein for generating three-dimensional (3D) skeletons of target objects using images of the target objects captured from different viewpoints. Images of a target object can be captured from different perspectives. Keypoints of the target object can be identified in the captured images. Keypoints that identify a same feature in separate images can be correlated using truncated epipolar lines. An epipolar line can be projected onto a first image using a keypoint identified in a second image. Depth information for a keypoint can be used to truncate an epipolar line that is created using the keypoint. Such depth information can comprise a depth map captured by a depth sensor or depth camera. A keypoint in the first image that is intersected by the truncated epipolar line may depict a same feature of the target object as the keypoint in the second image The two keypoints can be correlated and associated with the same feature of the target object. The correlated feature keypoints can be used to create 3D feature coordinates for the associated features of the object. A 3D skeleton for the target object can be generated using the 3D feature coordinates. In some implementations, the target object is a person and the identified features of the person are various human body parts.

In some implementations, one or more 3D models can be mapped to the 3D skeleton. For example, a 3D mesh can be positioned in a 3D scene using the 3D skeleton. Portions of the 3D mesh associated with various body parts can be anchored to 3D feature coordinates associated with the same body parts. The one or more 3D models can be rendered and displayed on one or more display devices.

In some implementations, points in a 3D point cloud can be constrained to one or more volumetric shapes associated with the 3D skeleton. A 3D point cloud can be generated using depth maps received from one or more depth cameras. The points in the point cloud can be associated with various feature coordinates of the 3D skeleton. Volumetric shapes associated with the various feature coordinates can be used to constrain the points of the point cloud.

As described herein, a variety of other features and advantages can be incorporated into the technologies as desired.

DETAILED DESCRIPTION

Overview

Figure 1:
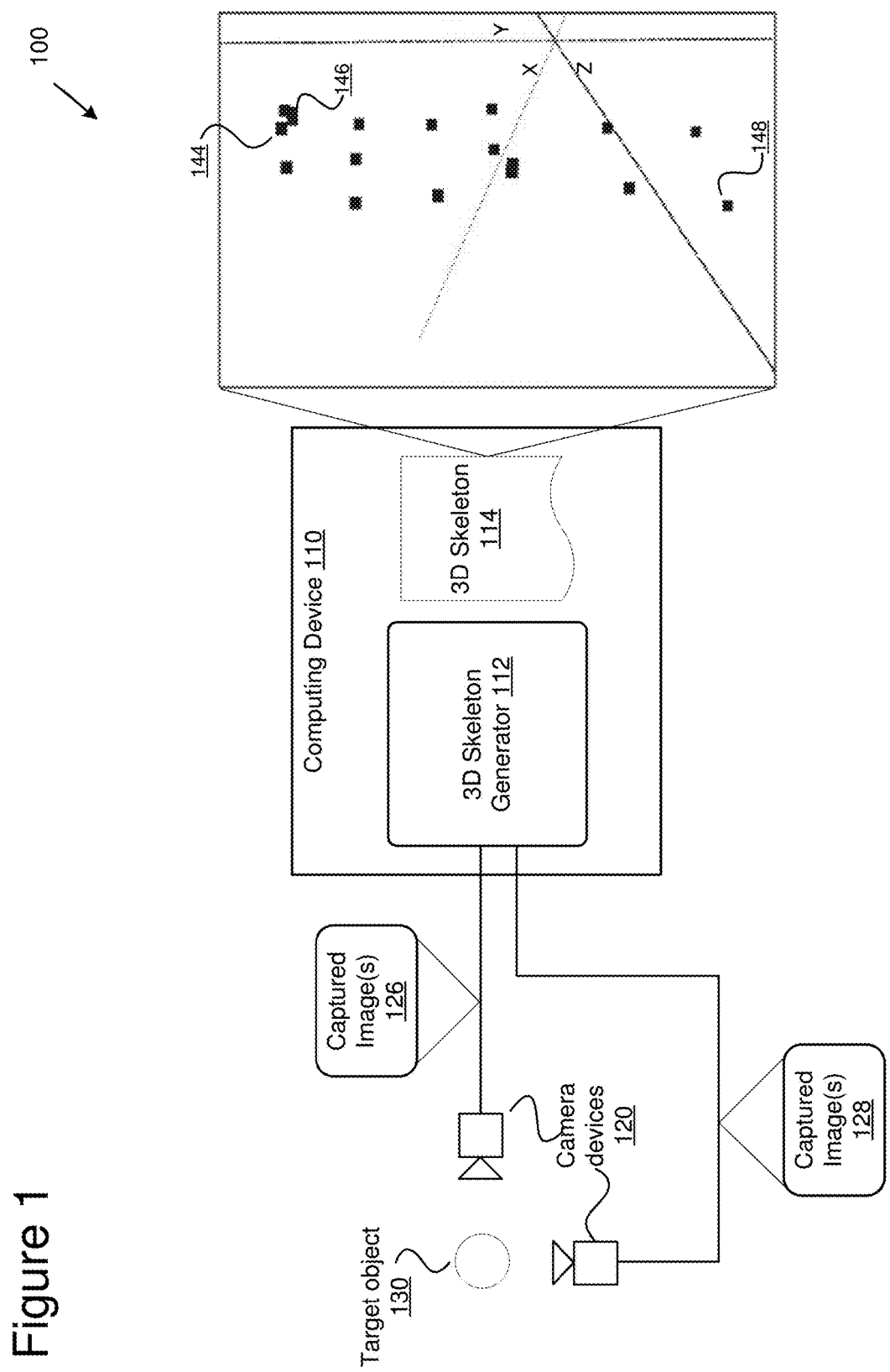
FIG. 1 is a diagram depicting an example environment for generating a three-dimensional (3D) skeleton for a target object.

Technologies described herein can be used to create a 3D skeleton of a target object. Such a 3D skeleton can be used to position and manipulate a 3D representation of the target object.

Cameras (such as video cameras) are used to capture images of real-world objects or environments (e.g., people or things) from different viewpoints. Depth sensors (or depth cameras) can be used to generate depth information in addition to the images captured by the cameras. For example, depth sensor can use infrared (IR) bandpass filters and an IR speckle pattern to improve stereo correspondence matching. In some implementations, the cameras and depth sensors are associated with one another, such that a depth value captured by a given depth sensor can be associated with a point (or pixel) in an image captured by a given camera.

Images that depict a target object from different viewpoints can be received and analyzed to detect recognizable features of the target object. For example, computer visualization techniques can be used to analyze the separate images and detect keypoints in the images associated with various features of the target object. Keypoints in separate images can be correlated using truncated epipolar lines.

In some previous systems, epipolar lines are used to correlate points in separate images. In such a system, a keypoint in one image that is used to generated an epipolar line in another image may be correlated with a keypoint in the another image that is intersected by the epipolar line. However, in scenes involving multiple objects, a given epipolar line may intersect multiple keypoints in an image. Using just an epipolar line, it is not possible to know which, of the multiple intersected keypoints, should be correlated with the keypoint used to generate the epipolar line. Using a truncated epipolar line can solve this problem by limiting the area of the image inspected for intersecting keypoints to an area that is more likely to contain features of the target object, and not features of other objects in the scene.

Depth information associated with a keypoint can be used to truncate an epipolar line generated using the keypoint. A depth value for the keypoint can be retrieved from a depth map captured by a depth sensor associated with the camera that captured the image containing the keypoint. The depth value can be used to define a segment of an epipolar line (i.e., a truncated epipolar line) that is projected onto another image using the keypoint. Intersection detection can be restricted to the segment of the epipolar line. A keypoint that is intersected by the truncated epipolar line can be correlated with the keypoint used to generate the epipolar line.

Correlated keypoints can be used to construct a 3D coordinate for a feature of the target object. For example, the 3D coordinate can be triangulated using the 2D positions of the correlated keypoints and the 3D positions and intrinsic parameters of the cameras. The 3D feature coordinates can then be linked to create a 3D skeleton of the target object.

One or more 3D models can be applied to the 3D skeleton to create a 3D representation of the target object. In some implementations, a point cloud is generated using depth information received from the depth sensors and is fitted to 3D volumetric shapes that are anchored to the 3D skeleton. Fitting the point cloud points to the volumetric shapes can comprise constraining the point cloud points to volumetric shapes associated with closest 3D coordinates of the 3D skeleton.

In some implementations, received images depict more than one target object. For example, the received images can depict multiple people in a scene. Truncated epipolar lines can be used to prevent identified feature points of different people in the scene from being correlated. Separate 3D skeletons can be generated for the multiple people and used to create separate 3D representations of the multiple people.

The 3D representation(s) of the target object(s) can then be transmitted to a renderer that renders it into a viewable format that is then ready for output to a holographic display device, or to another type of display device. For example, the renderer can generate left and right images to display the 3D representation of the target object in a virtual reality or augmented reality headset. Some examples of holographic display devices that can be utilized as output devices include the Microsoft® HoloLens® and the HTC VIVE™.

The technologies described herein can be used to implement a holoportation system. Holoportation is a type of 3D capture technology that allows high quality 3D models of people and/or environments to be constructed and transmitted to a viewer in real-time. In some implementations, the 3D models are transmitted to remote locations for viewing. Holoportation allows users to see and interact with remote participants in 3D as if they are actually present in their physical space.

3D Skeletonization Environments

In the technologies described herein, environments can be provided to generate 3D skeletons from captured images. For example, the environments can comprise computing devices running the various components in a local environment or in remote environments.

FIG. 1 is a diagram depicting an example environment 100 for generating a 3D skeleton 114 of a target object 130. The example environment 100 comprises a computing device 110 comprising a 3D skeleton generator 112. The 3D skeleton generator 112 can be configured to generate the 3D skeleton 114 using 2D images 126 and 128 that depict the target object 130 from different perspectives. The images 126 and 128 can be captured by multiple camera devices 120 positioned to capture image of a scene containing the target object 130 from different viewpoints. Although two camera device 120 are depicted in FIG. 1, more or fewer camera devices can be used in some embodiments. In some cases, it may be possible to use a single camera device that is moved around a scene to capture images of the target object 130 from different perspectives.

The 3D skeleton generator 112 can comprise one or more hardware and/or software components of the computing device 110. The 3D skeleton generator 112 can receive the captured images 126 and 128 from the camera devices 120 via one or more wired and/or wireless connections. The camera devices 120 can comprise video cameras and the captured images can comprise captured video frames. Additionally or alternatively, the camera devices 120 comprise cameras configured to synchronize image capture. The captured images 126-128 can be color images, monochrome images, or some combination thereof. In at least some embodiments, a camera device comprises a color camera configured to capture an RGB (Red-Green-Blue) image of the scene comprising the target object 130 and a depth camera configured to capture depth information about the scene. In such an embodiment, the captured images can comprise RGB pixels and associated depth values. For example, a captured image can comprise a 2D RGB image and an associated depth map.

The 3D skeleton generator 112 can identify corresponding keypoints of the target object 130 in the captured images using truncated epipolar lines. Keypoints can be points in an image (such as pixels or pixel areas) that are associated with identifiable features of the target object. For example, in cases where the target object 130 is a human being, the keypoints can be points in the image associated with various human body parts. A keypoint can be associated with a keypoint type that identifies a type of feature with which the keypoint is associated. For example, in a case where the target object 130 is a human being, keypoint types can include human body part types (e.g., left eye, right eye, head, left hand, right hand, left foot, right foot, etc.) Additionally or alternatively, a keypoint can be associated with a confidence score that indicates a statistical probability that the keypoint in the image depicts a given feature.

The 3D skeleton generator 112 can identify keypoints in the received images 126 and 128 using various computer visualization techniques (such as neural networks, convolution networks, convolutional pose machines (CPMs), etc.). Once keypoints of the target object 130 have been identified in the captured images, the 3D skeleton generator 112 can identify corresponding keypoints in the images using truncated epipolar lines. Two keypoints in separate images can be said to correspond if they identify a same feature of the target object 130 (such as a same human body part, etc.). An epipolar line can be created using a ray from a focal point of one of the camera devices through a given keypoint in an image captured by the camera device. An epipolar line can be created by projecting the ray on to another image captured by another of the camera devices. The epipolar line will intersect any corresponding keypoint in the another image. For example, if a first keypoint for a first image identifies a human hand, and a second keypoint for a second image identifies a human hand, the two keypoints may correspond to the same human hand if an epipolar line projected on the second image using the first keypoint intersects (or is relatively close to) the second keypoint.

In at least some cases, a given epipolar line may intersect more than one keypoint. For example, in a "busy" scene that comprises multiple objects keypoints for multiple objects may be detected and a given epipolar line may intersect more than one keypoint in a given image. In such cases, the epipolar line can be truncated so that only a portion of the epipolar line is examined for intersecting keypoints. An epipolar line can be truncated using depth information about the scene comprising the target object 130. For example, in an embodiment where the camera devices comprise depth cameras, depth maps associated with the captured images can be used to truncate an epipolar line projected on to another captured image. A depth value associated with a keypoint detected in a first image can be used to identify a segment of an epipolar line that is likely to intersect points in a second image that are at the depth of the keypoint detected at the first image. A keypoint in the second image intersected by the truncated epipolar line can be considered to correspond to the keypoint in the first image.

The 3D skeleton generator 112 can be configured to map corresponding keypoints to 3D coordinates in a 3D space. For example, the captured images can be considered to be 2D projections of the 3D scene including the target object 130. Once it has been determined that two keypoints in separate captured images correspond to a same feature of the target object 130, a 3D coordinate of the feature can be triangulated using the corresponding keypoints.

The 3D skeleton generator 112 can generate the 3D skeleton 114 of the target object 130 using the 3D keypoint coordinates. In embodiments where the keypoints are associated with keypoint types, the 3D keypoint coordinates can be associated with the keypoint types as well. The 3D skeleton 114 can link the 3D keypoint coordinates using known relationships between the keypoint types. For example, the example 3D skeleton depicted in FIG. 1 comprises 3D keypoint coordinates (e.g., 144, 146, and 148) associated with various human body parts. Example 3D coordinate 144 is associated with a right eye, example 3D coordinate 146 is associated with a node, and example 3D coordinate 148 is associated with a right foot.

In at least some embodiments, one or more 3D models (such as 3D meshes, 3D volumetric meshes, or the like) can be mapped to the 3D skeleton 114 and rendered. For example, the 3D keypoint coordinates (and/or other coordinates in the 3D skeleton inferred from the 3D keypoint coordinates) can serve as anchor points for the 3D model(s). Thus, in at least some cases, positions and/or poses of the 3D models can be controlled by positions and/or poses of the 3D keypoint coordinates in the 3D skeleton.

Figure 2:
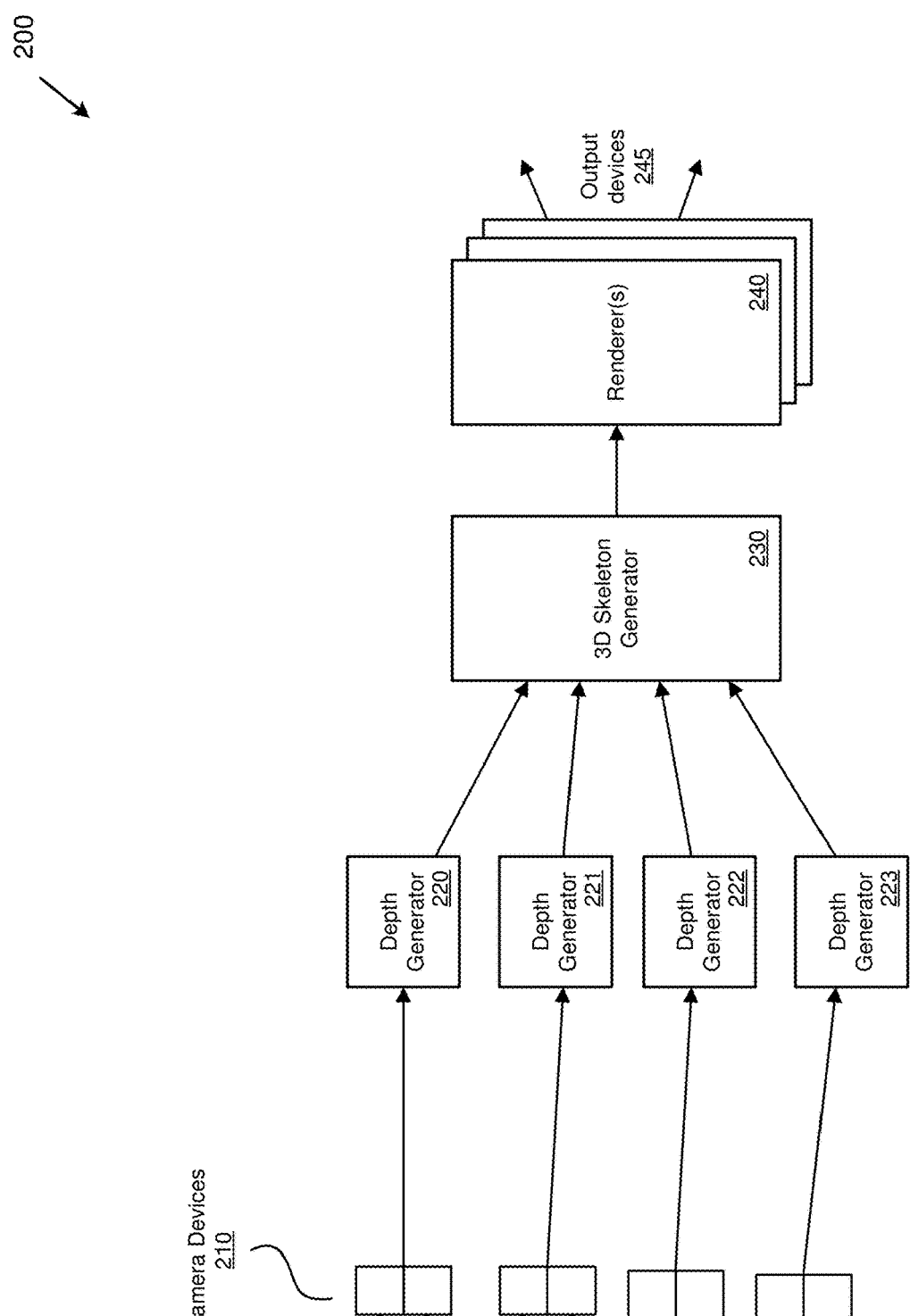
FIG. 2 is a diagram depicting another example environment for generating a 3D skeleton for a target object.

FIG. 2 is a diagram depicting another example environment 200 for generating a 3D skeleton for a target object. The example environment 200 includes a number of camera devices 210. For example, each of the camera devices 210 can include one or more video cameras. Additionally or alternatively, the camera pods 210 can include depth sensors configured to capture depth information. In the example environment 200, there are eight camera devices 210 depicted. However, more or fewer camera devices can be utilized. In some implementations, a minimum of two camera devices are used to provide enough depth information to generate a 3D skeleton, but more camera devices can, in some situations, improve the quality of the generated 3D skeleton.

In the example environment 200, there are four depth generators (also called depth generator components), 220 through 223. Each depth generator receives video information from two camera devices (e.g., via a wired connection such as a USB cable, via a wireless connection, or via a network connection). For example, depth generator 220 receives video information from the top two camera devices. In this arrangement, the depth generator 220 generates a live depth map from a single viewpoint. The remaining depth generators 221, 222, and 223 each receive video information from their respective group of two camera devices and generate their respective live depth maps.

A depth generator refers to the software and/or hardware that receives and processes the video input from one or more cameras. In general, a depth generator performs some or all of the following operations: receiving video images from one or more video cameras (e.g., comprising monochrome and/or color images), generating depth maps from the received video images (e.g., from monochrome images and/or captured depth information), and transmitting the depth maps and/or color images to the 3D skeleton generator 230. In some implementations, each depth generator is a software application that runs on a different computing device. For example, each depth generator, 220 through 223, can run on its own computer, with each computer having two graphics cards each processing video data for one video pod. However, depth generators can run on more or fewer computing devices, or on virtual machines (e.g., using cloud computing resources).

The example environment 200 comprises a 3D skeleton generator 230. The 3D skeleton generator 230 uses the captured images and depth maps received from the depth generators 220-223 to generate a 3D skeleton of a target object. In at least some embodiments, the generator 230 can be configured to generate a 3D model (also called a 3D mesh or 3D volumetric mesh) from the depth maps and to map the 3D model to the generated 3D skeleton.

In some implementations, the 3D skeleton generator 230 runs as software on a separate computing device or separate virtual machine. In general, a 3D skeleton generator performs some or all of the following operations: receiving depth maps from the depth generators, receiving color images from the depth generators, generating 3D skeletons from the color images and depth maps, mapping 3D models to the 3D skeletons, and transmitting the 3D models to the renderers 240.

In the example environment 200, there are one or more renderers 240 (also called renderer components). The renderers 240 receive the 3D model from the 3D skeleton generator 230 and render it into a viewable format. In some implementations the renderers 240 apply the color information that was captured from the color cameras of the camera devices 210 as a texture map. For example, the captured images can be stitched together to create a texture map that can be applied to a projection of the 3D model (e.g., by a pixel shader). Additionally or alternatively, one or more texture maps can be applied to the 3D model that are not based on the captured color information (such as custom skins, filters, or the like). The 3D output is provided to output devices 245 for display. For example, each of the renderers 240 can produce 3D output for a specific output device (e.g., a specific holographic display device or headset). A renderer can also produce output in a two-dimensional format (e.g., for display on a computer monitor or sending to a web site). In some implementations, the renderer 240 runs as software on a separate computing devices or separate virtual machines. In general, a renderer performs some or all of the following operations: receiving 3D models from the 3D skeleton generator, receiving color images from the 3D skeleton generator, applying color to the 3D models using the color images to create color 3D models and/or applying texture maps to the 3D models, processing the color 3D models into an output video in a format compatible with a particular output device (e.g., two images for a virtual reality or augmented reality headset, a single video stream, etc.), and outputting the output video (e.g., sending to a connected headset, sending to a connected monitor, sending via a network, etc.).

In some implementations, each component (e.g., each of the depth generators 220-223, the 3D skeleton generator 230, each of the renderers 240, and the control panel 250) runs on a separate computing device (e.g., a separate physical computer or server, or a separate virtual machine). However, in some implementations, some of the components can run on the same computing device (e.g., the 3D skeleton generator 230 and the renderers 240 could run on the same server) and/or run using cloud computing resources (e.g., as separate components that run using cloud computing resources).

In the example environment 200, the components can be located at the same location. For example, the components could all reside in a single room or in the same building (e.g., connected via a local area network). In some implementations, some or all of the components can be located in different locations (e.g., connected via wide area networks, such as the Internet).

3D Skeletonization Methods

In the technologies described herein, methods can be provided for generating 3D skeletons using captured images of people (and/or other types of objects). 3D models can be bound to the 3D skeletons and rendered for display to users (e.g., using holographic display devices).

Figure 3:
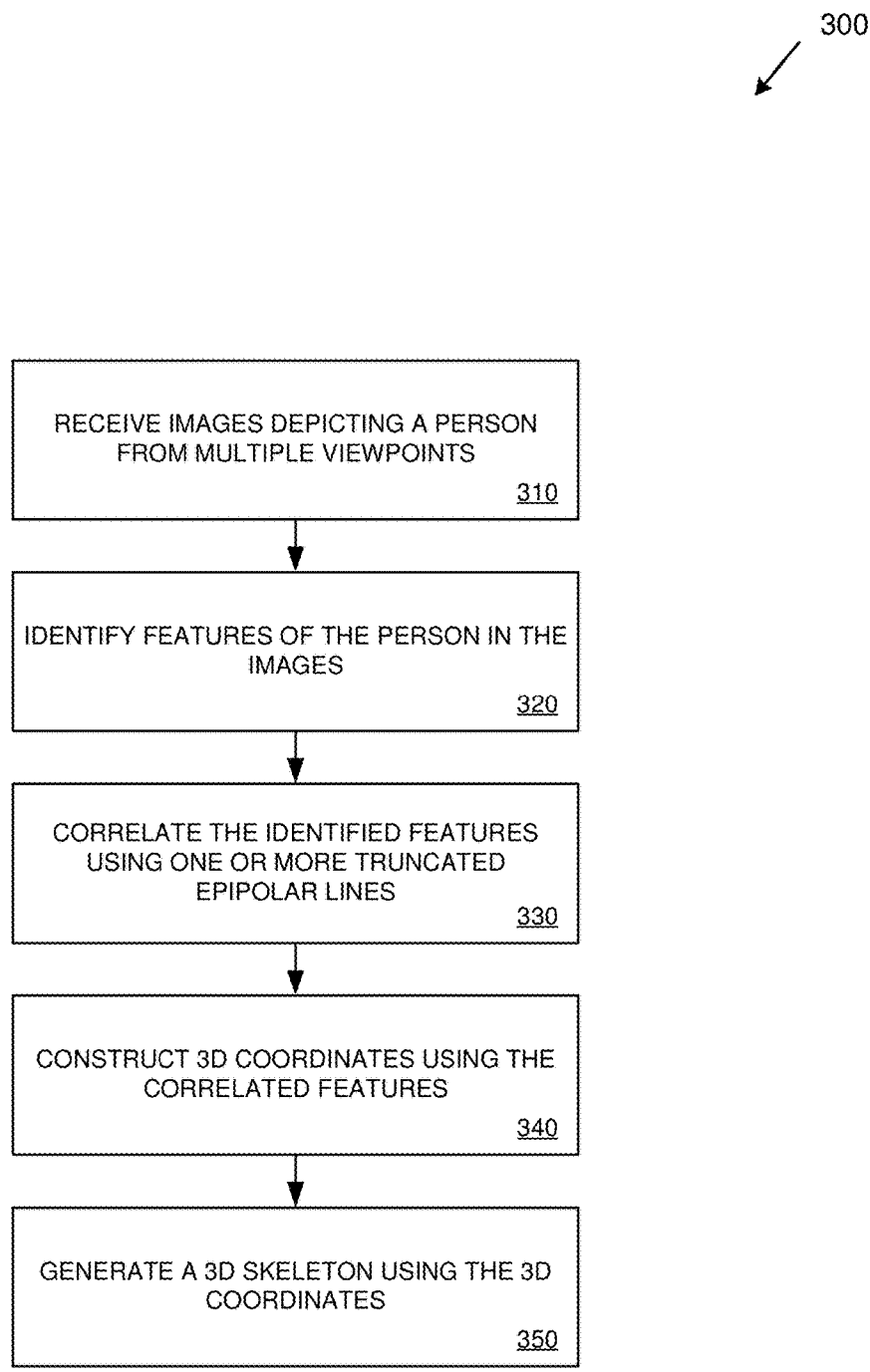
FIG. 3 is a flowchart of an example method for 3D skeletonization.

FIG. 3 is a flowchart of an example method 300 for generating a 3d skeleton of a person. Any of the example environments described herein can be used to perform the example method 300.

At 310, images are received that depict a person from multiple viewpoints. The images can be received from multiple cameras configured to capture a scene comprising the person from the multiple viewpoints. In at least one embodiment, the cameras comprise video cameras and the captured images comprise video frames depicting the person. The images can be received via one or more wired and/or wireless connections. The images may be received as part of a batch transmission. For example, images from multiple cameras can be received in a batch transmission that is associated with a given moment in time. In embodiments where the images are received from video cameras, multiple such batches can be received that are associated with different frame captures from the various video cameras.

At 320, features of the person are identified in the images. The features can be identified using computer visualization techniques. For example, one or more human features and/or poses can be detected in the images using neural networks, CPMs, etc. that are trained to recognize the one or more human features and/or poses. A given image can be organized as a matrix of pixels (such as RGB 3-vectors, RGBD 4-vectors, or the like). One or more belief maps can be generated that identify pixels (or pixel areas) of the image that may depict various human features (such as various human body parts) of the person. The identified features can be associated confidence scores that indicate a probability that an identified pixel (or pixel area) depicts a given type of human feature (such as a left hand, right foot, etc.).

At 330, the identified features are correlated using one or more truncated epipolar lines. An epipolar line can be used to identify features in two separate images that may potentially be correlated. If an epipolar line is projected on a first image using a position of a feature identified in a second image, and the epipolar line intersects a feature identified in the first image, it is possible that the two feature points identify a same 3D feature of the person. To increase the likelihood that the two feature points identify the same feature of the person, the epipolar line can be truncated to restrict possible intersections to an area of the image depicting the person.

In at least some embodiments, depth information for the scene including the person can be used to truncate the epipolar line. Such depth information can be received along with, or as part of, the images depicting the person. For example, the depth sensors can be used in conjunction with the cameras that capture the images to capture depth data for the scene from the viewpoints of the cameras. Such depth information can comprise depth maps comprising depth values associated with pixels of associated images. In a particular embodiment, the depth values for the pixels can be embedded in the received images (such as images comprising RGBD 4-vectors, or the like). Such depth values can indicate distances of given points from a given depth sensor.

For a given feature point in an image, an associated depth value can be used to create a range of depth values that includes the depth value of the feature point. After an epipolar line is projected onto another image using the given feature point, the range of depth values can be used to truncate the epipolar line. The correlating can be repeated for additional features identified in the received images. In at least some cases, the correlating is limited to feature points in the images that are associated with features of a same feature type. For example, if the two feature point in separate images are each identified as depicting a left hand, then a truncated epipolar line will be used to determine whether the two feature points are correlated. However, if one of the feature points is identified as depicting a left hand, and the other feature point is identified as depicting a right ear, then no attempt to correlate the two feature points will be made.

At 340, 3D coordinates of the correlated features are constructed. Once identified feature points for a given feature of the person have been correlated, the correlated feature points can be used to determine a coordinate (and/or volume) of the feature in a 3D space. For example, if the relative positions of the cameras that captured the images containing the correlated feature points are known, then a 3D position of the feature can be triangulated using the 2D positions of the correlated feature points. In a particular embodiment, triangulating the correlated feature points comprises using a direct linear transformation (DLT). However, other triangulation techniques are also possible.

At 350, a 3D skeleton is generated using the 3D feature coordinates. Generating the 3D skeleton can comprise defining 3D vectors that link the 3D feature coordinates. The 3D feature coordinates can be linked based on relationships between feature types associated with the 3D feature coordinates. For example, a 3D feature coordinate associated with a left foot feature type can be linked to a 3D feature coordinate associated with a left knee feature type. In at least some embodiments, additional 3D coordinates may be inferred and linked to the 3D feature coordinates. For example, if one 3D feature coordinate is associated with a right shoulder feature type, and another 3D feature coordinate is associated with a right hand feature type, a "right elbow" coordinate may be inferred at a point between the two 3D feature coordinates and linked to the two 3D feature coordinates.

In at least some embodiments, the images received at 310 depict multiple people. In such an embodiment, the truncated epipolar lines can be used to distinguish between separate features of the multiple people. The features of the different people can be correlated and used to generate separate 3D skeletons for the multiple people.

Figure 4:
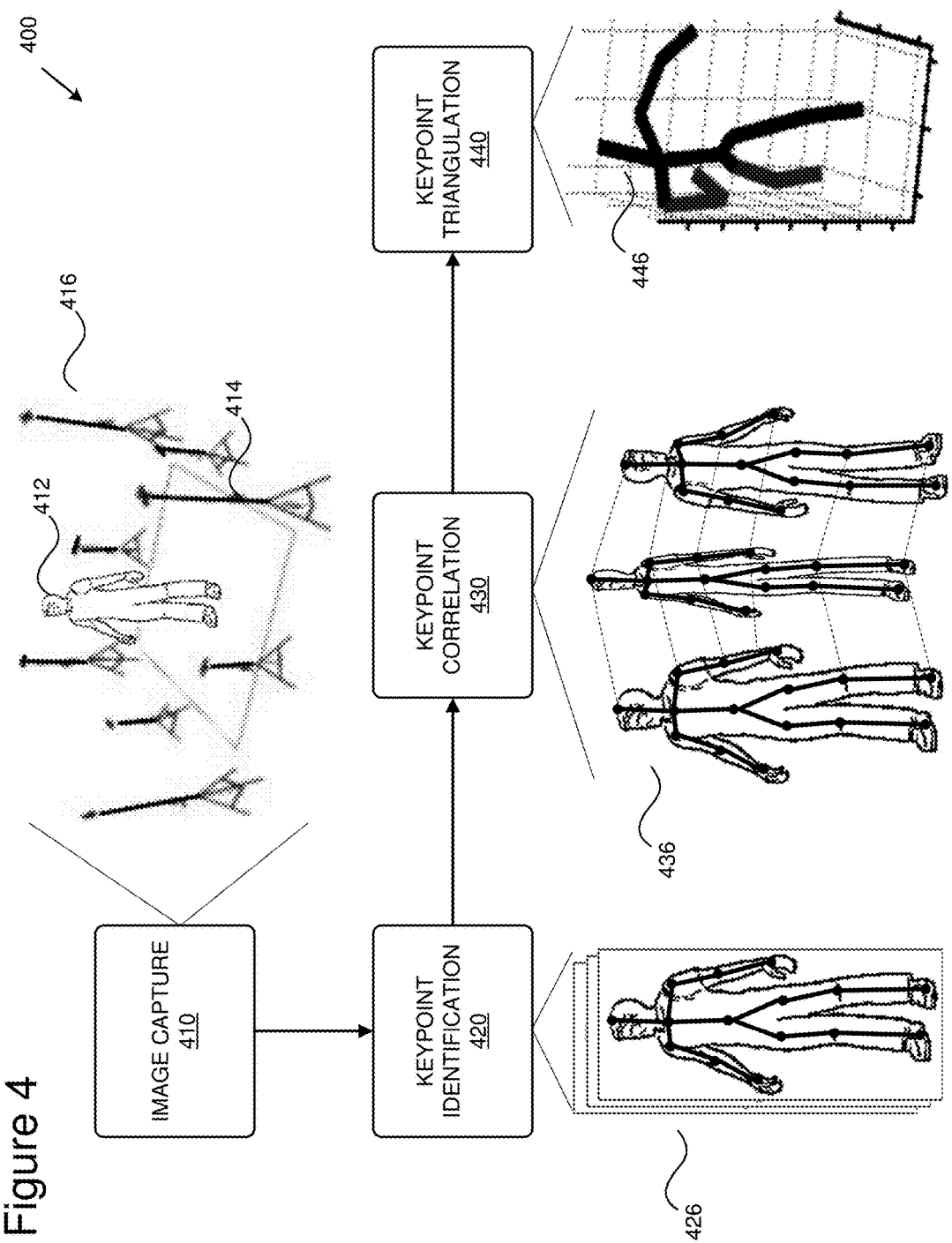
FIG. 4 is a dataflow diagram of an example method for 3D skeletonization.

FIG. 4 is a dataflow diagram of an example method 400 for generating a 3D skeleton for a human. Any of the example environments described herein can be used to perform the example method 400.

At 410, multiple images of a human 412 are captured using multiple camera devices (e.g., 414) positioned in a scene 416 to view the human 412 from multiple viewpoints. The positions of the camera devices in FIG. 4 is provided for illustration and is not intended to be limiting. The multiple camera devices can comprise cameras that capture color images, monochrome images, or some combination thereof. In at least some embodiments the camera devices comprise depth sensors configured to capture depth maps associated with captured images. The captured images and associated depth maps can be transmitted from the camera devices to one or more computing devices configured to perform 3D skeletonization operations.

At 420, keypoints associated with body parts of the human 412 are detected in the captured images. Identifying the keypoints can comprise performing feature detection operations. For example, one or more convolution networks (or one or more CPM's) can be used to identify keypoints in the captured images that depict various body parts of the human 412. In at least some cases, the keypoint identification 420 can comprise a 2D skeletonization process. FIG. 400 depicts multiple example images of the human 412 in which keypoints have been detected and 2D skeletons of the detected keypoints have been generated. The 2D keypoints depicted in FIG. 400 are intended for illustration, and are not intended to be limiting. In at least one embodiment, each captured image is analyzed for eighteen different keypoints. Other numbers of keypoints are also possible. The captured images depict the human 412 from various different viewpoints. Thus, at least some of the keypoints detected in the different images will be associated with depictions of a same body part from different perspectives. In at least some embodiments, a confidence score is determined for an identified keypoint that indicates a statistical probability that the detected keypoint in the image depicts a given body part.

At 430, the detected keypoints are correlated using truncated epipolar lines. FIG. 400 depicts example captured images 436 depicting the human 412. The example captured images 436 are overlaid with 2D skeletons comprising keypoints identified in the images at 420. The keypoint correlation 430 identifies keypoints across the various captured images that are associated with a same body part of the human 412. In FIG. 400, example correlations are depicted as dashed lines connecting keypoints in the example images 436.

Two keypoints in different images can be correlated using a truncated epipolar line. A keypoint in a first image can be used to project a truncated epipolar line onto a second image. If the epipolar line intersects a keypoint in the second image, then the two keypoints can be considered to identify a same body part of the human 412 and can be correlated. In an embodiment where confidence scores are determined for the keypoints with respect to identified body parts, the confidence scores can be used to select image keypoints for use in performing correlation operations for the given body part. For example, a first keypoint in one of the images with a highest confidence score with respect to a given body part can be selected. A second keypoint in another of the images with a second highest confidence score with respect to the given body part can then be selected. The first keypoint can then be used to project a truncated epipolar line on the another image. If the truncated epipolar line intersects (or comes close to intersecting) the second keypoint, then the two keypoints can be correlated.

Depth information associated with the keypoints can be used to truncate the epipolar lines used in the correlating operations. A pixel coordinate position of a keypoint in an image can be used to look up a depth value for the keypoint in a depth map associated with the image. The depth value can be used to truncate an epipolar line projected onto another image using the keypoint. The keypoint can be considered to correlate to a keypoint in the another image that is intersected by (or close to) the epipolar line.

In at least some embodiments, a priority region of the human 412 in the received images can be identified. A priority region can be a region of increased complexity and/or interest of the human 412. For example, the priority region can be a face or head region of the human 412. Additional computational resources can be applied to identifying and correlating keypoints within the identified priority region than are applied to identifying and correlating features outside of the priority region. For example, additional computational resources can be applied to identifying and correlating feature keypoints in depictions of the human 412's face than are applied to identifying and correlating feature keypoints in a torso or leg region of the human 412.

At 440, 3D coordinates are triangulated using the correlated keypoints, and a 3D skeleton 446 for the human 412 is generated. Correlated keypoints can be used to reconstruct 3D coordinates of associated features of the human 412 in a 3D space using triangulation. The images containing the correlated keypoints can be considered to be 2D projections of the 3D scene 416 from the perspectives of the respective cameras. The 2D coordinates of the correlated keypoints in their respective images, and the relative positions of the associated cameras that captured the images, can be used to triangulate a 3D position of a body part associated with the correlated keypoints. In a particular embodiment, a direct linear transform can be used to triangulate a 3D coordinate using correlated keypoints. However, other triangulation techniques are possible.

A 3D skeleton 446 of the human 412 can be generated using the 3D coordinates for the body parts. The 3D skeleton 446 can be used to create a 3D representation of the human 412. For example, one or more 3D meshes that model various human body parts can be anchored to the 3D coordinates with which the respective body parts are associated. Additionally or alternatively, other types of 3D meshes can be anchored and positioned based on the 3D skeleton. Examples include custom 3D character models, filters, skins, etc.

Epipolar Line Truncation

In any of the examples herein, keypoints (or feature points) in various images can be correlated using truncated epipolar lines.

Figure 5:
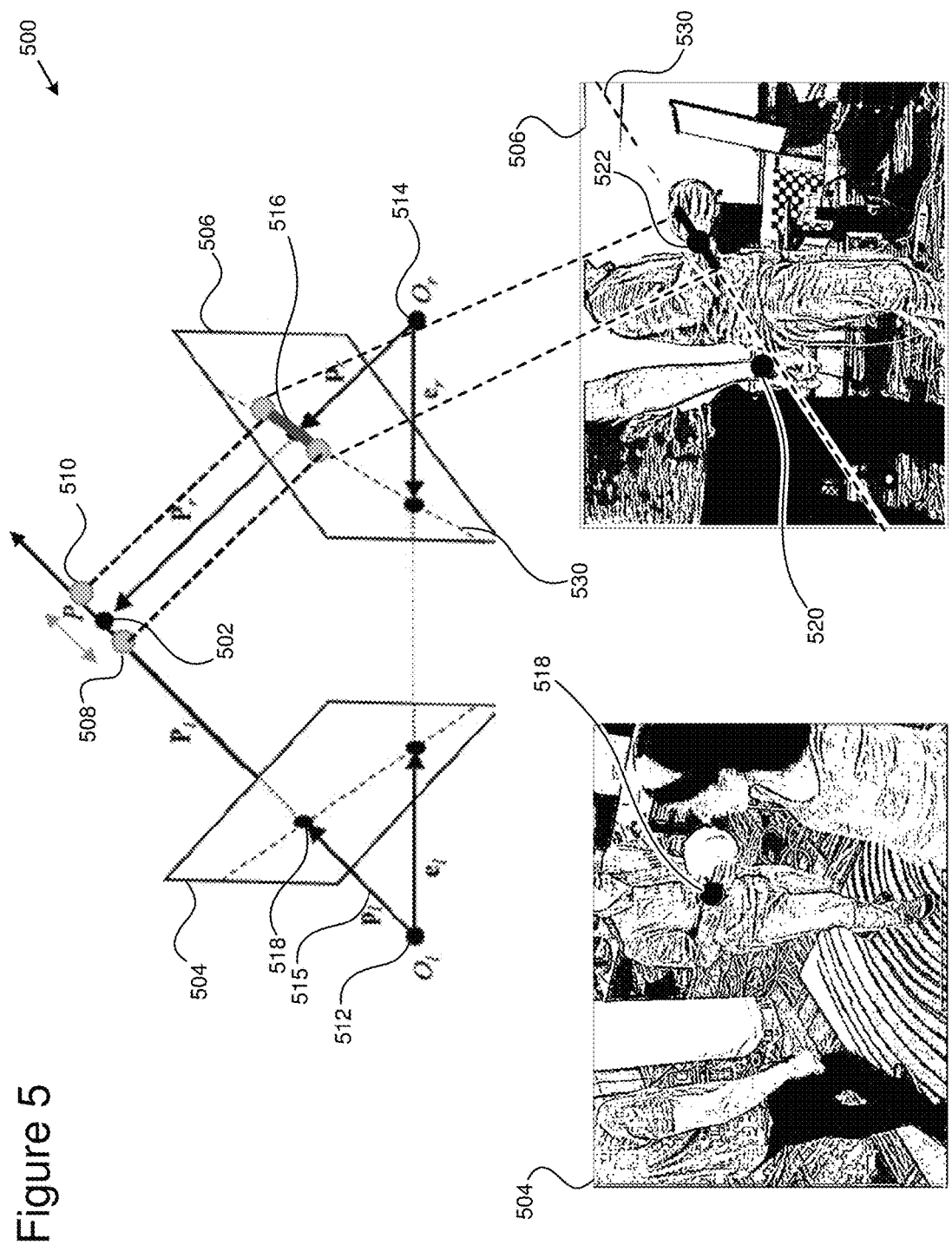
FIG. 5 is a diagram of an example epipolar line truncation.

FIG. 5 is a diagram of an example epipolar line truncation. FIG. 5 depicts two images of a scene (504 and 506) captured by separate cameras positioned to view the scene from different perspectives. The focal points for the two cameras that captured the images 504 and 506 are depicted as points 512 and 514, respectively. For illustration purposes, graphical depictions of the images 504 and 506 are depicted. Although the images are depicted as monochromatic in FIG. 5, this is not intended to be limiting. Color images can also be used.

Using one or more feature detection techniques, as described herein, a keypoint 518 is identified in image 504. In this example, the keypoint 518 is associated with a "right hand" feature type. The 3D point in the scene that is depicted by the keypoint 518 is shown in FIG. 5 as the point 502. Using the same or different feature detection techniques, two keypoints (520 and 522) are identified in the image 506. A truncated epipolar line, generated using the keypoint 518, can be used to determine if one of the keypoints 520 and 522 in image 506 is correlated with the keypoint 518.

A ray 515 can be cast from the camera focal point 512 through the keypoint 518 in the 2D projection of the image 504. In 3D space, such a ray would intersect the 3D point 502 associated with the keypoint 518. The ray 515 is projected onto the image 506 as an epipolar line 530. A ray cast from the camera focal point 514 through a correlated point (that depicts the same 3D point from a different perspective) in the 2D projection of the image 506 should also intersect the 3D point 502. Thus, a correlated keypoint in the image 506 should be intersected by the epipolar line 530.

However, in the example scene depicted in image 506, both keypoints 520 and 522 are intersected by the epipolar line 530. So, using an un-truncated epipolar line, it is not clear which of the keypoints 520 and 522 should be correlated with the keypoint 518. In this example, both keypoints 520 and 522 are associated with a same "right hand" keypoint type (the same keypoint type that is associated with the keypoint 518), so limiting keypoint correlation to keypoints that match the keypoint type of keypoint 518 does not avoid the double-intersection. Such scenarios can occur (as in this example) when a given scene involves multiple objects of a same type (such as multiple people). To address this issue, a truncated epipolar line can be used to restrict the epipolar line intersection test to a segment of the epipolar line associated with the 3D point 502.

A truncated epipolar line can be created using depth information associated with the keypoint 518. Such depth information can be retrieved from a depth map of the scene captured by a depth sensor associated with the camera with the focal point 512. The depth information can comprise a distance value that indicates a distance between the camera focal point 512 and the 3D point 502 in 3D space. This distance can be used to estimate a segment 516 of the ray 515 where the feature of the target object (in this example, a right hand) is located in the 3D space. A truncation distance can be specified that can be used to define two points (508 and 510) on the ray 515. The truncation distance can be subtracted from the distance value of the keypoint 518 to define the point 508, and the truncation distance can be added to the distance value of the keypoint 518 to define a point 510. The points 508 and 510 can be used to define a truncated of the epipolar line 516 (i.e., a segment of the epipolar line 530) that is projected onto the image 506. It can be seen in the depiction of image 506 that the truncated epipolar line 516 intersect the correct corresponding keypoint 522, and avoids the incorrect keypoint 520.

3D Model Generation and Manipulation

In the technologies described herein, methods can be provided for manipulating depth information to create a 3D representation of a target object using a 3D skeleton.

Figure 6:
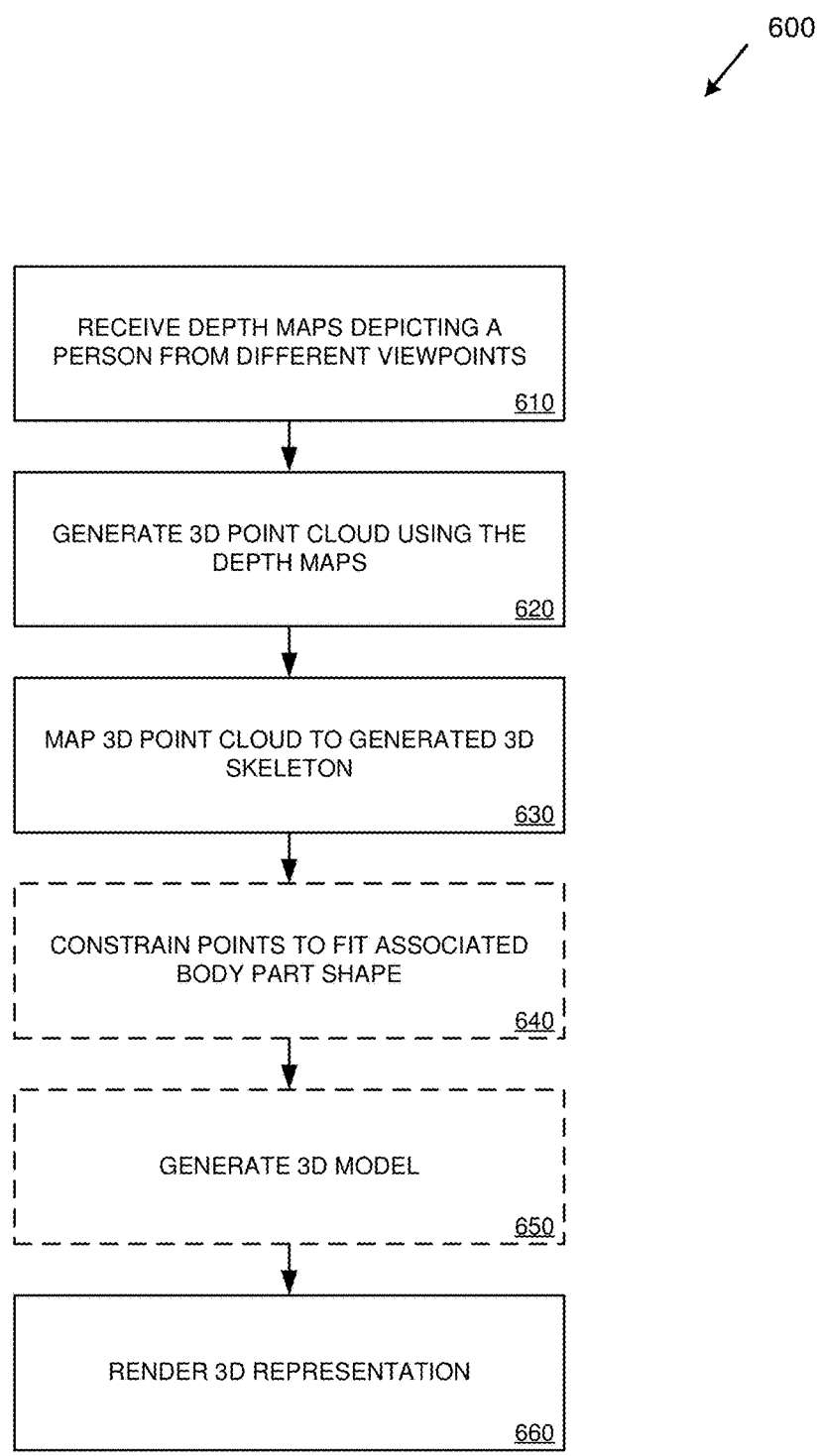
FIG. 6 is a flowchart of an example method for mapping a 3D model to a generated 3D skeleton.

FIG. 6 is a flowchart of an example method 600 for mapping a 3D model to a generated 3D skeleton. Any of the example environments described herein can be used to perform the example method 600.

At 610 depth maps depicting a person from different viewpoints are received. The depth maps can be received from depth cameras configured to capture depth information about a 3D scene containing the person. A depth map can comprise a matrix of depth values associated with points in the scene. A depth value for a given point can indicate an estimated distance of the given point from the depth camera. In at least some embodiments, a depth map can be received with a color image of the scene. The color image can be captured by a camera that is associated with the depth camera and is configured to capture the color image of the scene from a same or similar viewpoint as the depth camera. In some cases, the depth map can be embedded in the color image. For example, data captured by a color camera and associated depth camera can be combined to create a matrix of RGBD 4-vectors for points in the scene. For a given point, three values (i.e., RGB) can represent a color 3-vector for the point, and the fourth value (i.e., D) can represent a depth value of the point.

At 620, a 3D point cloud is generated using the depth maps. For a given point in a depth map, a 3D point can be generated using the depth value of the point and the position of the depth camera that captured the depth map in 3D space. The 3D points created for points in a depth map can be referred to as a 3D point cloud. If relative positions of multiple depth cameras are known, then points in separate depth maps captured by the multiple depth cameras can be added to a same 3D point cloud. In at least some embodiments, a threshold depth can be used to filter out background points. Doing so, in at least some cases, can limit the points in the depth cloud to points that are on or near the person in the scene.

At 630, the 3D point cloud is mapped to a generated 3D skeleton. Points in the 3D point cloud can be associated with feature coordinates of the 3D skeleton. For a given point in the 3D point cloud, a closest feature coordinate can be identified and associated with the point. Additionally or alternatively, volumetric shapes can be associated with various parts of the 3D skeleton. For each volumetric shape, points in the point cloud that are within (and/or close to) the volumetric shape can be identified and linked to the associated part of the 3D skeleton. The volumetric shapes can correspond to body parts. For example, a sphere can be associated with a "head" feature coordinate of the 3D skeleton, a volume in the shape of a forearm can be associated with a region of the 3D skeleton between an "elbow" feature coordinate and a "hand" feature coordinate, etc. In at least some embodiments, points in the 3D point cloud that are not sufficiently close to any feature coordinate (or volumetric shape) of the 3D skeleton are removed. In at least some cases, depth data captured using depth cameras can include noise. Removing points from the point cloud that are not sufficiently close to the 3D skeleton can sometimes reduce this noise.

Optionally, at 640, one or more points of the point cloud are constrained to fit an associated volumetric shape. As discussed above, volumetric shapes can be associated with various parts of the 3D skeleton. Positions of points associated with a given volumetric shape can be adjusted to move the points closer to a surface of the volumetric shape. In some cases, variations in point positions can result in a "noisy" appearance of the point cloud, when the points are rendered. Constraining the points to fit associated volumetric shapes tied to the 3D skeleton can smooth this noise and result in a more uniform appearance.

In at least some cases, a maximum distance value can be specified to restrict the amount that a given point can be constrained. For example, for a given point in the point cloud, a closest point on a surface of an associated volumetric shape can be identified. If a distance between the point cloud point and the point on the surface of the volumetric shape is less than the maximum distance value, then the point cloud point can be moved to the point on the surface of the volumetric shape. However, if the distance is greater than the maximum distance value, then the point cloud point can be moved the maximum distance value towards the point on the surface of the volumetric shape.

Optionally, at 650, a 3D model is generated. A 3D model can be created that is mapped to the 3D point cloud. For example, a default mesh of a generic human body can be mapped to the 3D skeleton and transformed to conform to volumetric proportions defined by the 3D point cloud. For example, a portion of the mesh can be transformed based on volumetric proportions of points in the 3D point cloud associated with a 3D keypoint coordinate of the 3D skeleton to which the portion of the mesh is anchored. The transformation can be constrained by rules associated with a body part type for the 3D keypoint coordinate. This can ensure that the transformation of the mesh does not result in a mesh that does not conform to the associated body part. Using such techniques, 3D filters and skins can be applied to a 3D representation of the person. Such filters and skins include decorative meshes applied to body parts of the person, dressing the person in virtual clothing, adjusting the physical appearance of the person, etc.

In at least some embodiments, 3D model can comprise a 3D avatar selected by the person. The 3D avatar can be positioned using the generated 3D skeleton and used as a virtual representation of the person instead of, or in addition to, the person's physical appearance.

At 660, a 2D projection of the 3D of the person representation is rendered. The 3D representation can comprise the 3D point cloud mapped to the generated 3D skeleton. A 2D projection of the mapped point cloud can be rendered from a given view port position. The points in the point cloud that are visible from the given view port position can be rendered as individual dots. Alternatively, a surface that conforms to the contours of the points in the point cloud can be rendered.

Alternatively, if a 3D model was generated at 650, rendering the 3D representation can comprise rendering the 3D model mapped to the generated 3D skeleton. In at least some embodiments, a texture map associated with the 3D model can be applied to a 2D projection of the 3D model as part of the rendering process. Such a texture map can be applied (for example) by a pixel shader.

In some cases, a view port with which the rendering is performed can be moved in a 3D space containing the 3D representation of the person. In such cases, multiple renderings of the 3D representation can be performed as the viewport position is updated.

Computing Systems

Figure 7:
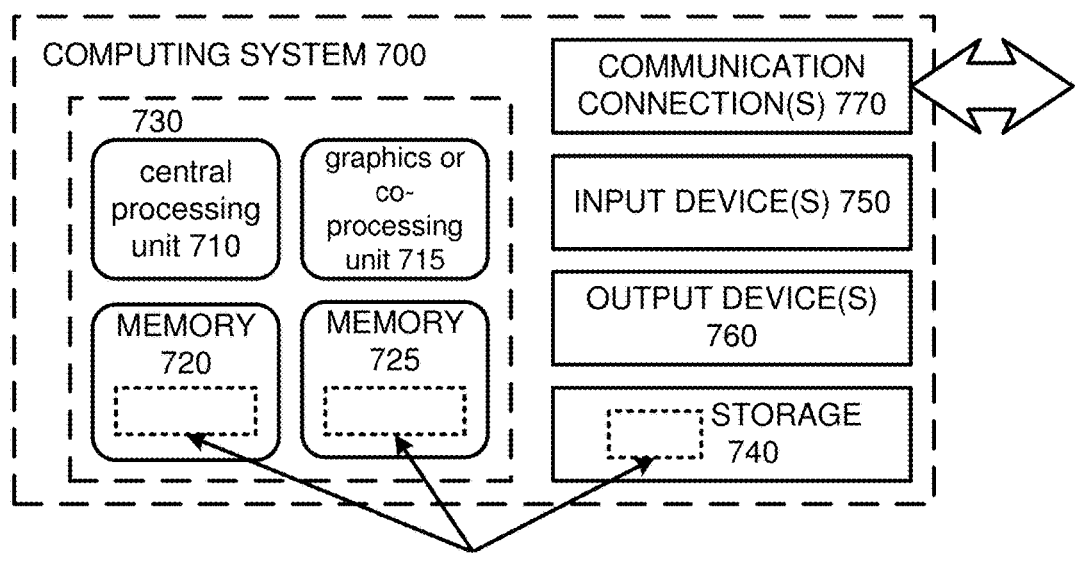
FIG. 7 is a diagram of an example computing system in which some described embodiments can be implemented.

FIG. 7 depicts a generalized example of a suitable computing system 700 in which the described technologies may be implemented. The computing system 700 is not intended to suggest any limitation as to scope of use or functionality, as the technologies may be implemented in diverse general-purpose or special-purpose computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more technologies described herein, in the form of computer-executable instructions suitable for execution by the processing unit(s).

A computing system may have additional features. For example, the computing system 700 includes storage 740, one or more input devices 750, one or more output devices 760, and one or more communication connections 770. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 may be removable or non-removable, and includes magnetic disks, magnetic tapes or cassettes, CD-ROMs, DVDs, or any other medium which can be used to store information and which can be accessed within the computing system 700. The storage 740 stores instructions for the software 780 implementing one or more technologies described herein.

The input device(s) 750 may be a touch input device such as a keyboard, mouse, pen, or trackball, a voice input device, a scanning device, or another device that provides input to the computing system 700. For video encoding, the input device(s) 750 may be a camera, video card, TV tuner card, or similar device that accepts video input in analog or digital form, or a CD-ROM or CD-RW that reads video samples into the computing system 700. The output device(s) 760 may be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The technologies can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Mobile Device

Figure 8:
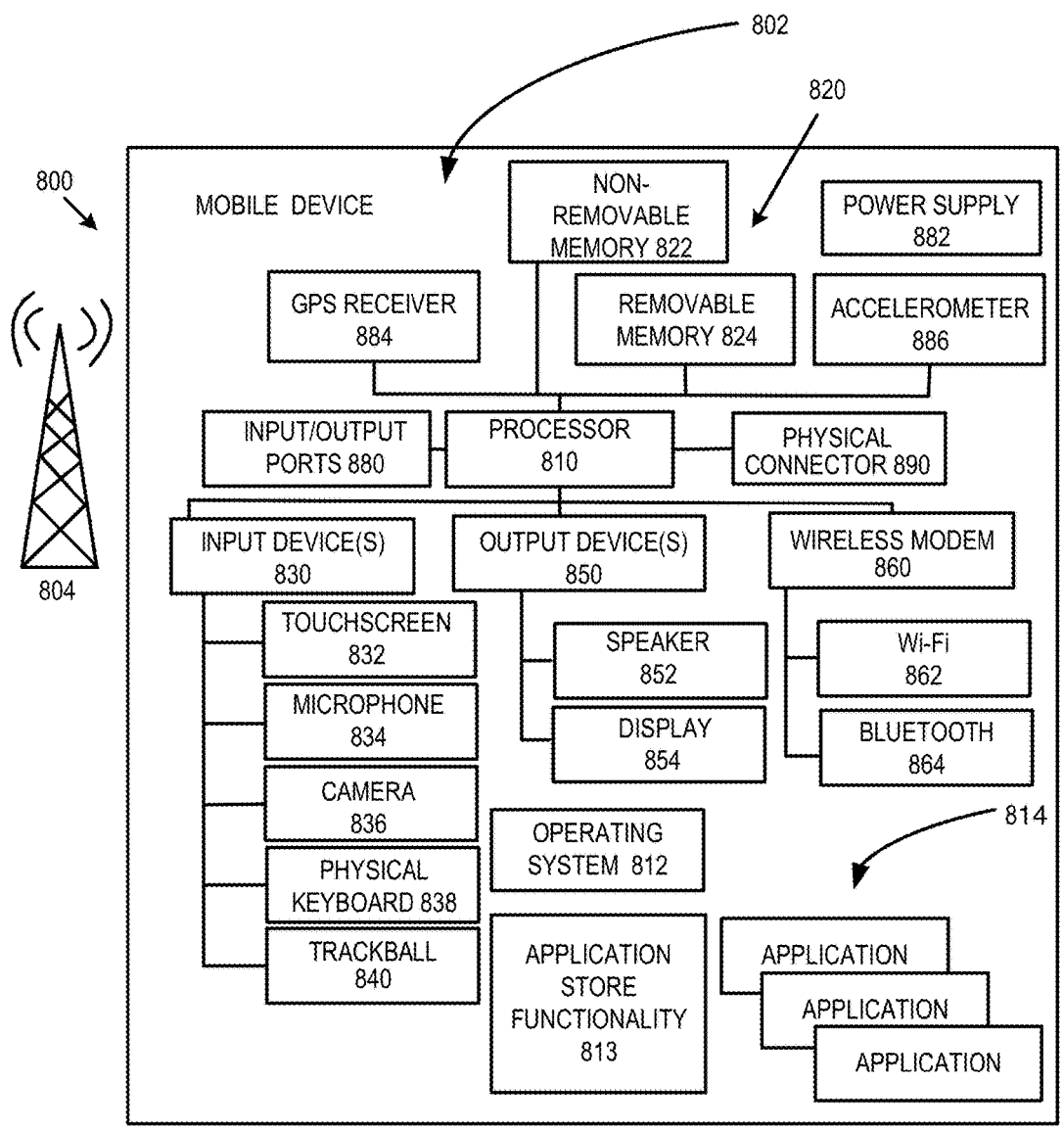
FIG. 8 is an example mobile device that can be used in conjunction with the technologies described herein.

FIG. 8 is a system diagram depicting an example mobile device 800 including a variety of optional hardware and software components, shown generally at 802. Any components 802 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 804, such as a cellular, satellite, or other network.

The illustrated mobile device 800 can include a controller or processor 810 (e.g., signal processor, microprocessor, ASIC, or other control and processing logic circuitry) for performing such tasks as signal coding, data processing, input/output processing, power control, and/or other functions. An operating system 812 can control the allocation and usage of the components 802 and support for one or more application programs 814. The application programs can include common mobile computing applications (e.g., email applications, calendars, contact managers, web browsers, messaging applications), or any other computing application. Functionality 813 for accessing an application store can also be used for acquiring and updating application programs 814.

The illustrated mobile device 800 can include memory 820. Memory 820 can include non-removable memory 822 and/or removable memory 824. The non-removable memory 822 can include RAM, ROM, flash memory, a hard disk, or other well-known memory storage technologies. The removable memory 824 can include flash memory or a Subscriber Identity Module (SIM) card, which is well known in GSM communication systems, or other well-known memory storage technologies, such as "smart cards." The memory 820 can be used for storing data and/or code for running the operating system 812 and the applications 814. Example data can include web pages, text, images, sound files, video data, or other data sets to be sent to and/or received from one or more network servers or other devices via one or more wired or wireless networks. The memory 820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 800 can support one or more input devices 830, such as a touchscreen 832, microphone 834, camera 836, physical 838 and/or trackball 840 and one or more output devices 850, such as a speaker 852 and a display 854. Other possible output devices (not shown) can include piezoelectric or other haptic output devices. Some devices can serve more than one input/output function. For example, touchscreen 832 and display 854 can be combined in a single input/output device.

The input devices 830 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 812 or applications 814 can comprise speech-recognition software as part of a voice user interface that allows a user to operate the device 800 via voice commands. Further, the device 800 can comprise input devices and software that allows for user interaction via a user's spatial gestures, such as detecting and interpreting gestures to provide input to a gaming application.

A wireless modem 860 can be coupled to an antenna (not shown) and can support two-way communications between the processor 810 and external devices, as is well understood in the art. The modem 860 is shown generically and can include a cellular modem for communicating with the mobile communication network 804 and/or other radio-based modems (e.g., Bluetooth 864 or Wi-Fi 862). The wireless modem 860 is typically configured for communication with one or more cellular networks, such as a GSM network for data and voice communications within a single cellular network, between cellular networks, or between the mobile device and a public switched telephone network (PSTN).

The mobile device can further include at least one input/output port 880, a power supply 882, a satellite navigation system receiver 884, such as a Global Positioning System (GPS) receiver, an accelerometer 886, and/or a physical connector 890, which can be a USB port, IEEE 1394 (FireWire) port, and/or RS-232 port. The illustrated components 802 are not required or all-inclusive, as any components can be deleted and other components can be added.

Cloud-Supported Environment

Figure 9:
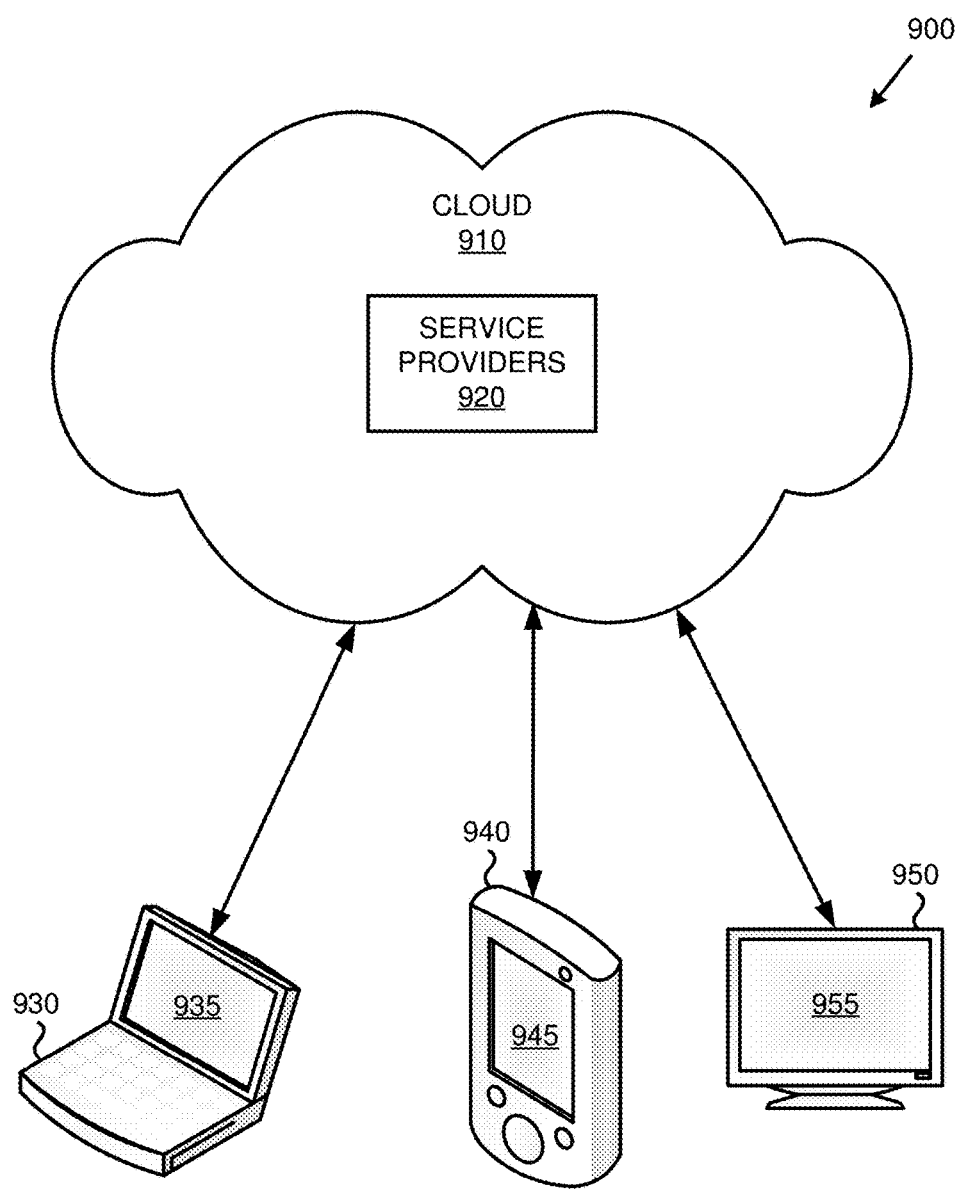
FIG. 9 is an example cloud-support environment that can be used in conjunction with the technologies described herein.

FIG. 9 illustrates a generalized example of a suitable cloud-supported environment 900 in which described embodiments, techniques, and technologies may be implemented. In the example environment 900, various types of services (e.g., computing services) are provided by a cloud 910. For example, the cloud 910 can comprise a collection of computing devices, which may be located centrally or distributed, that provide cloud-based services to various types of users and devices connected via a network such as the Internet. The implementation environment 900 can be used in different ways to accomplish computing tasks. For example, some tasks (e.g., processing user input and presenting a user interface) can be performed on local computing devices (e.g., connected devices 930, 940, 950) while other tasks (e.g., storage of data to be used in subsequent processing) can be performed in the cloud 910.

In example environment 900, the cloud 910 provides services for connected devices 930, 940, 950 with a variety of screen capabilities. Connected device 930 represents a device with a computer screen 935 (e.g., a mid-size screen). For example, connected device 930 could be a personal computer such as desktop computer, laptop, notebook, netbook, or the like. Connected device 940 represents a device with a mobile device screen 945 (e.g., a small size screen). For example, connected device 940 could be a mobile phone, smart phone, personal digital assistant, tablet computer, and the like. Connected device 950 represents a device with a large screen 955. For example, connected device 950 could be a television screen (e.g., a smart television) or another device connected to a television (e.g., a set-top box or gaming console) or the like. One or more of the connected devices 930, 940, 950 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 900. For example, the cloud 910 can provide services for one or more computers (e.g., server computers) without displays.

Services can be provided by the cloud 910 through service providers 920, or through other providers of online services (not depicted). For example, cloud services can be customized to the screen size, display capability, and/or touchscreen capability of a particular connected device (e.g., connected devices 930, 940, 950).

In example environment 900, the cloud 910 provides the technologies and solutions described herein to the various connected devices 930, 940, 950 using, at least in part, the service providers 920. For example, the service providers 920 can provide a centralized solution for various cloud-based services. The service providers 920 can manage service subscriptions for users and/or devices (e.g., for the connected devices 930, 940, 950 and/or their respective users).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 8, computer-readable storage media include memory 820 and 825, and storage 840. By way of example and with reference to FIG. 8, computer-readable storage media include memory and storage 820, 822, and 824. The term computer-readable storage media does not include signals and carrier waves. In addition, the term computer-readable storage media does not include communication connections, such as 870, 860, 862, and 864.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, assembly language, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A computing device, comprising:
a processing unit; and
a memory;
the computing device programmed, via computer-executable instructions, to perform operations for performing three-dimensional skeletonization, the operations comprising:
receiving multiple two-dimensional images of a target object, wherein the multiple two-dimensional images depict the target object from different perspectives;
identifying corresponding keypoints of the target object in the multiple two-dimensional images, wherein the identifying comprises projecting one or more truncated epipolar lines onto one or more of the multiple two-dimensional images using one or more keypoints in another one or more of the multiple two-dimensional images, wherein creating a truncated epipolar line comprises subtracting a truncation distance from a distance value associated with one of the keypoints, wherein the distance value is retrieved from a depth map associated with one of the multiple two-dimensional images;
mapping the corresponding keypoints to three-dimensional coordinates in a three-dimensional space; and
generating a three-dimensional skeleton of the target object using the three-dimensional coordinates.

2. The computing device of claim 1, wherein:
the target object is a human; and
identifying the corresponding keypoints in the multiple two-dimensional images comprises identifying a body part of the human being in two of the two-dimensional images that depict the body part from different perspectives.

3. The computing device of claim 1, wherein identifying the corresponding keypoints comprises:
projecting an epipolar line on a first of the two-dimensional images using a keypoint in a second of the two-dimensional images;
truncating the epipolar line using the depth map associated with the first of the two-dimensional images; and
identifying a corresponding keypoint in the first of the two-dimensional images using the truncated epipolar line.

4. The computing device of claim 1, wherein the operations further comprise:
mapping a three-dimensional model to at least part of the three-dimensional skeleton; and
rendering the three-dimensional model.

5. The computing device of claim 1, wherein the mapping the corresponding keypoints to three-dimensional coordinates comprises:
triangulating a three-dimensional coordinate in the three-dimensional space using two corresponding keypoints.

6. The computing device of claim 5, wherein the triangulating comprises determining a direct linear transformation using the two corresponding keypoints.

7. The computing device of claim 1, wherein identifying the corresponding keypoints comprises:
determining confidence scores for detected keypoints in the multiple two-dimensional images with respect to a feature of the target object;
selecting a first keypoint in one of the multiple two-dimensional images with a highest confidence score;
selecting a second keypoint in another of the multiple two-dimensional images with a second-highest confidence score; and
projecting a truncated epipolar line on the another of the multiple two-dimensional images using the first keypoint; and
determining that the truncated epipolar line intersects the second keypoint.

8. The computing device of claim 1, wherein:
the multiple two-dimensional images are captured by multiple cameras configured to view the target object from different perspectives.

9. The computing device of claim 1, wherein the operations further comprise:
mapping a three-dimensional point cloud to the three-dimensional skeleton.

10. The computing device of claim 1, wherein:
the target object comprises a human; and
the operations further comprise:
identifying a specified priority region of the human in the multiple two-dimensional images; and
applying more computational resources to identifying and correlating features in the specified priority region than are applied to identifying and correlating features outside the specified priority region.

11. A method, implemented by a computing device comprising a processing unit and a memory, the method comprising:
receiving images depicting a person from multiple viewpoints;
identifying features of the person in the images;
correlating the identified features using one or more truncated epipolar lines, wherein creating a truncated epipolar line comprises subtracting a truncation distance from a distance value associated with one of the features, wherein the distance value is retrieved from a depth map associated with one of the images;
constructing three-dimensional feature coordinates for the identified features using the correlated identified features; and
generating a three-dimensional skeleton of the person using the three-dimensional feature coordinates.

12. The method of claim 11, further comprising:
generating a point cloud based on depth information captured by one or more depth cameras;
mapping the point cloud to the three-dimensional skeleton of the person; and
moving one or more points of the point cloud closer to a surface of a volumetric shape associated with one of the three-dimensional feature coordinates.

13. The method of claim 11, wherein:
the received images depict multiple people; and
the method further comprises:
using the one or more truncated epipolar lines to distinguish between separate features of the multiple people; and
generating separate three-dimensional skeletons for the multiple people.

14. The method of claim 11, further comprising:
receiving the depth map associated with the one of the images from a depth camera.

15. The method of claim 11, further comprising:
mapping a three-dimensional mesh to the generated three-dimensional skeleton;
applying a texture model to at least part of the three-dimensional mesh; and
rendering a projection of a three-dimensional scene comprising the three-dimensional mesh with the texture model applied.

16. The method of claim 11, wherein the constructing three-dimensional feature coordinates for the identified features comprises triangulating positions of the three-dimensional feature coordinates using two-dimensional positions of the correlated features in the received images.

17. A system for generating a three-dimensional skeleton of a human, the system comprising:
multiple camera devices configured to capture images of a human from different viewpoints; and
a computing device comprising a processor and a storage medium storing executable instructions that, when executed by the processor, program the computing device to perform operations, the operations comprising:
receiving the captured images from the multiple camera devices;
detecting keypoints in the captured images associated with body parts of the human;
correlating the detected keypoints, wherein the correlating comprises projecting one or more truncated epipolar lines onto one or more of the captured images using one or more keypoints detected in another one or more of the captured images to determine that keypoints in separate images, of the captured images, are associated with a same body part depicted from different viewpoints, wherein creating a truncated epipolar line comprises subtracting a truncation distance from a distance value associated with one of the keypoints, wherein the distance value is retrieved from a depth map associated with one of the captured images;
triangulating three-dimensional coordinates for the body parts using the correlated keypoints associated with the body parts; and
generating a three-dimensional skeleton comprising the three-dimensional coordinates.

18. The system of claim 17, wherein:
the camera devices comprise depth sensors configured to capture depth maps associated with the captured images; and
the operations further comprise:
receiving the depth maps from the camera devices; and
generating the one or more truncated epipolar lines using one or more of the depth maps received from the camera devices.

19. The system of claim 18, wherein the generating the one or more truncated epipolar lines comprises:
identifying two keypoints in two images, of the captured images, associated with a same body party type;
projecting an epipolar line on a first of the two images using the keypoint in a second of the two images;
truncating the epipolar line using a depth map associated with the first of the two images; and
determining that the truncated epipolar line intersects the keypoint in the first of the two images.

20. The system of claim 17, wherein the operations further comprise:
positioning a three-dimensional avatar using the generated three-dimensional skeleton; and
rendering a two-dimensional projection of the positioned three-dimensional avatar.

* * * * *